(12) United States Patent
Chen et al.

(10) Patent No.: US 12,483,704 B2
(45) Date of Patent: Nov. 25, 2025

(54) CONVEX HULL ENCODING METHOD

(71) Applicant: Cidana (Shanghai) Co., Ltd., Shanghai (CN)

(72) Inventors: Leiming Chen, Shanghai (CN); Ruoyu Zhu, Shanghai (CN)

(73) Assignee: Cidana (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/801,170

(22) Filed: Aug. 12, 2024

(65) Prior Publication Data

US 2025/0159174 A1  May 15, 2025

Related U.S. Application Data

(60) Provisional application No. 63/597,755, filed on Nov. 10, 2023.

(51) Int. Cl.
| | | |
|---|---|---|
| H04N 7/12 | (2006.01) | |
| H04N 19/119 | (2014.01) | |
| H04N 19/124 | (2014.01) | |
| H04N 19/127 | (2014.01) | |
| H04N 19/142 | (2014.01) | |
| H04N 19/154 | (2014.01) | |
| H04N 19/30 | (2014.01) | |

(52) U.S. Cl.
CPC ......... *H04N 19/127* (2014.11); *H04N 19/119* (2014.11); *H04N 19/124* (2014.11); *H04N 19/142* (2014.11); *H04N 19/154* (2014.11); *H04N 19/30* (2014.11)

(58) Field of Classification Search
CPC .................................................. H04N 19/124
See application file for complete search history.

(56) References Cited

U.S. PATENT DOCUMENTS 11,553,188 B1 *  1/2023  Shi .......................... H04N 19/59

* cited by examiner

*Primary Examiner* — Young Lee

(57) ABSTRACT

A method of forming a convex hull encoding method is provided. The method includes the step of providing a source video clip; splitting the source video clip by a video splitter with a similar scene; slicing each video shots to a preset length video shots; providing down-sampling process, encoding process, decoding process and up-sampling process to obtain the analysis video shots; calculating a quality index between the video shots and the analysis video shots to obtain quality metrics; selecting convex hull points and calculating slopes between the convex hull points; picking operation points with similar slopes to form operation point series and predicting quantizer parameters; encoding the source video clip by the quantization parameters and the corresponding resolutions to obtain a compressed video.

5 Claims, 6 Drawing Sheets

CONVEX HULL ENCODING METHOD

CROSS REFERENCE TO RELATED APPLICATIONS

The present application claims the benefit of U.S. Provisional Patent Application No. 63/597,755 filed on Nov. 10, 2023, the contents of which are incorporated herein by reference in their entirety.

BACKGROUND OF THE INVENTION

1. Field of the Invention

The present invention generally relates to a convex hull encoding method, and in particular, to the different analysis steps of the convex hill encoding method for reducing the high computational demands.

2. Description of the Related Art

In the present generation, watching and sharing the video data provides an explosive growth. The portable devices and the network streaming application continually growth and develop. However, the bandwidth has not increased as much as the data amount of the video. The video processing infrastructure is being increasingly strained by the large amount of data that need to be processed before it can be distributed through communication networks. Thus, the network streaming video, like VOD (Video On Demand), depends on the video encoding and decoding capabilities. The new video coding standards are being continuously developed to help improve the video coding efficiency, for example the standards like H.264/AVC, H.265/HEVC, VP9, AV1 and VVC.

The encoding performance can be evaluated by the BD-rate and the coding speed. There must be a trade-off between the two performances. When the coding time is reduced, the coding efficiency may be also reduced. If we use the complex encoding method to obtain the good coding efficiency, the coding speed becomes slower and the coding time may increase. Besides, the computational loading to the computing device will also increase. These characteristics may easily affect the conventional encoding process when pursuing the improvement in one aspect. Therefore, the conventional encoding method still has some considerable problems.

In summary, the conventional encoding method to the video clip needs high computational demands and still has considerable problems. Hence, the present disclosure provides the convex hull encoding method to resolve the shortcomings of conventional technology and promote industrial practicability

SUMMARY OF THE INVENTION

In view of the aforementioned technical problems, the primary objective of the present disclosure is to provide a convex hull encoding method, which is capable of solving the problem of the coding efficiency and the computational complexity.

In accordance with one objective of the present disclosure, a convex hull encoding method is provided. The method includes the following steps of: providing a source video clip; splitting the source video clip into a plurality of video shots by a video splitter, the plurality of video shots having a similar scene determined by a scene change detector; slicing each of the plurality of video shots to obtain a plurality of preset length video shots; providing down-sampling process to the plurality of preset length video shots to obtain a plurality of low resolution video shots; encoding the plurality of preset length video shots and the plurality of low resolution video shots with a preset fast encoding parameter and preset constant rate factors to obtain a plurality of encoded video shots and decoding the plurality of encoded video shots to obtain a plurality of decoded video shots; providing up-sampling process to the plurality of decoded video shots to obtain a plurality of analysis video shots; calculating a quality index between the plurality of preset length video shots and the plurality of analysis video shots to obtain quality metrics; selecting convex hull points of the quality metrics and calculating slopes between the convex hull points; picking a plurality of operation points from the convex hull points with similar slopes to form a plurality of operation point series and predicting a plurality of quantizer parameters of the plurality of operation point series and corresponding resolutions; encoding the source video clip by the plurality of quantization parameters and the corresponding resolutions to obtain a compressed video.

Preferably, the quality index may include peak signal to noise ratio, structural similarity index measure or video multi-assessment method fusion.

Preferably, the preset fast encoding parameter may be M8 of the SVT-AV1, values of the preset constant rate factors may be 23, 27, 31, 35, 39, 43, 47, 51, 55, 59 and 63.

Preferably, the convex hull encoding method may further include: decoding the compressed video and calculating a BD-rate between the source video clip and the compressed video.

Preferably, the source video clip may be 1080p and the plurality of low resolution video shots may be 720p, 540p, 432p and 360p.

In accordance with one objective of the present disclosure, a convex hull encoding method is provided. The method includes the following steps of: providing a source video clip; splitting the source video clip into a plurality of video shots by a video splitter, the plurality of video shots having a similar scene determined by a scene change detector; providing down-sampling process to the plurality of video shots to obtain a plurality of low resolution video shots; encoding the plurality of video shots and the plurality of low resolution video shots with a preset fast encoding parameter and preset constant rate factor points to obtain a plurality of encoded video shots and decoding the plurality of encoded video shots to obtain a plurality of decoded video shots; providing up-sampling process to the plurality of decoded video shots to obtain a plurality of analysis video shots; calculating a quality index between the plurality of video shots and the plurality of analysis video shots to obtain partial quality metrics; calculating the partial quality metrics to obtain quality metrics by using interpolation to the preset constant rate factor points; selecting convex hull points of the quality metrics and calculating slopes between the convex hull points; picking a plurality of operation points from the convex hull points with similar slopes to form a plurality of operation point series and predicting a plurality of quantizer parameters of the plurality of operation point series and corresponding resolutions; encoding the source video clip by the plurality of quantization parameters and the corresponding resolutions to obtain a compressed video.

Preferably, the quality index may include peak signal to noise ratio, structural similarity index measure or video multi-assessment method fusion.

Preferably, the preset fast encoding parameter may be M8 of the SVT-AV1, the preset constant rate factor points may be 23, 35, 43, 51, 59 and 63 and other constant rate factor points 27, 31, 39, 47 and 55 may be obtained by the interpolation calculation.

Preferably, the convex hull encoding method may further include: decoding the compressed video and calculating a BD-rate between the source video clip and the compressed video.

Preferably, the source video clip may be 1080p and the plurality of low resolution video shots may be 720p, 540p, 432p and 360p.

Preferably, each of the plurality of video shots may be further sliced to obtain a plurality of preset length video shots for providing the down-sampling process.

As mentioned previously, the convex hull encoding method in accordance with the present disclosure may have one or more advantages as follows.
1. The convex hull encoding method is capable of reducing the computational demands in the conventional convex hull encoding by using the convex hull points analysis before the actual encoding step. The suitable parameters can be used at the encoding process for improving the performance of the encoder.
2. The convex hull encoding method may divide the source video to video shots by the scene change detector. Since the changes of the image features in the similar scene are gentle, the coding process only needs to perform in part of the entire video. The data amount in the calculation may be reduced. The computational cycle and encoding speed can be improved significantly.
3. The convex hull encoding method may use the preset quantization parameters to perform the encoding process, the other rate-distortion points on the curve can be obtained by the interpolation method. The method needs less computational demands while maintain the BD-rate largely at the same level.

BRIEF DESCRIPTION OF THE DRAWINGS

The technical features, detail structures, advantages and effects of the present disclosure will be described in more details hereinafter with reference to the accompanying drawings that show various embodiments of the invention as follows.

DETAILED DESCRIPTION OF THE PREFERRED EMBODIMENTS

Figure 1:
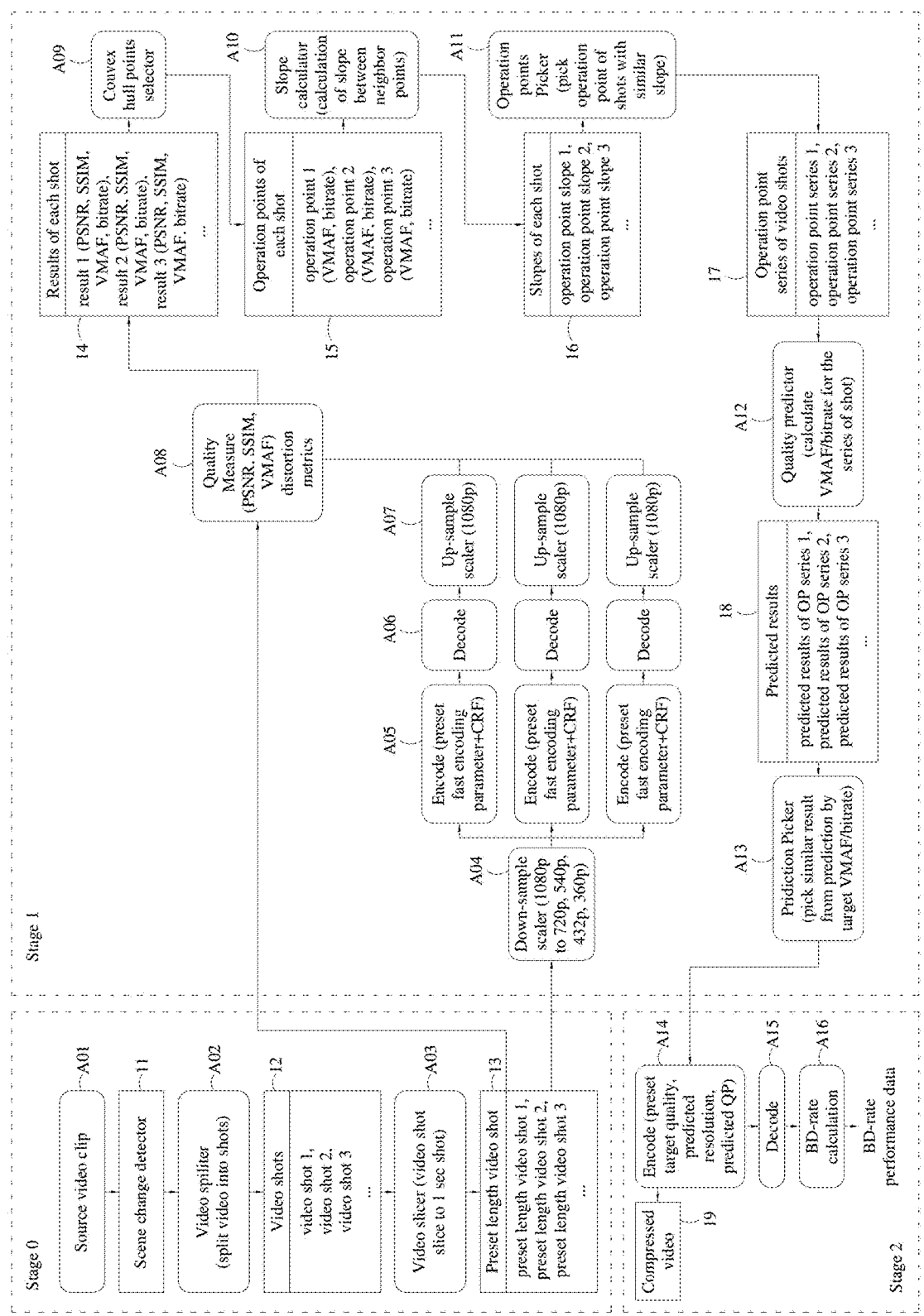
FIG. 1 is the process flow of the convex hull encoding method in accordance with the first embodiment of the present disclosure.

In order to facilitate the understanding of the technical features, the contents and the advantages of the present disclosure, and the effectiveness thereof that can be achieved, the present disclosure will be illustrated in detail below through embodiments with reference to the accompanying drawings. The diagrams used herein are merely intended to be schematic and auxiliary to the specification, but are not necessary to be true scale and precise to the configuration after implementing the present disclosure. Thus, it should not be interpreted in accordance with the scale and the configuration of the accompanying drawings to limit the scope of the present disclosure on the practical implementation.

As those skilled in the art would realize, the described embodiments may be modified in various different ways. The exemplary embodiments of the present disclosure are for explanation and understanding only. The drawings and description are to be regarded as illustrative in nature and not restrictive. Similar reference numerals designate similar elements throughout the specification.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

Please refer to FIG. 1, which is the process flow of the convex hull encoding method in accordance with the first embodiment of the present disclosure. As shown in FIG. 1, the convex hull encoding method includes three stages. The first stage (stage 0) is the pre-processing process conducted to the source video. The second stage (stage 1) is the analysis process to the video shots. The third stage (stage 2) is the actual coding process to the source video.

In stage 0, the convex hull encoding method includes the following steps (A01-A03):
  Step A01: providing a source video clip. The source video clip may be the video containing video on demand contents, such as movie, TV drama, music video. The video is broadcasted through the internet and the streaming application has grown significantly. Considering the large amount of data transferred through the communication network, the source video clip needs to be encoded and compressed for transmission and then decoded on the user side. The encoder performance can be evaluated by the BD-rate and the speed. The BD-rate is the difference in bitrate of video streams between two encoders when providing comparable image quality. Under a given image quality, the lower the bit rate, the better coding efficiency. A negative value of the BD-rate indicates that the test encoder is more efficient than the reference encoder. The speed is the computation periods or cycles used for the encoding process. The faster speed means that the encoder may have the lower computational complexity and loading.
  Step A02: splitting the source video clip into a plurality of video shots by a video splitter, the plurality of video shots having a similar scene determined by a scene change detector. In the present disclosure, the source video clip is input to the scene change detector 11. The scene change detector 11 checking whether the scenes in the source video clip have changed. This change may be determined by the amount of change in pixels in each frame. Then the source video clip is splitting into a plurality of video shots 12 by a video splitter. The plurality of video shots 12 have the similar scene.

Step A03: slicing each of the plurality of video shots to obtain a plurality of preset length video shots. In the previous step, the source video clip is splitting into a plurality of video shots 12 and each of the plurality of video shots 12 may have a different length. The similar scenes can be encoded with similar parameters, the present step slices each of the plurality of video shots into the plurality of preset length video shots by the video slicer. The plurality of preset length video shots have the same preset video length, for example, a one-second video. The plurality of preset length video shots are used to be the analysis data for the next stage. Since the analysis data has been reduced to the preset length video, the computational complexity of the following analysis steps can be significantly reduced.

In stage 1, the convex hull encoding method includes the following steps (A04-A13):

Step A04: providing down-sampling process to the plurality of preset length video shots to obtain a plurality of low resolution video shots. In the present embodiment, the resolution of the source video clip is 1080p and the considered resolutions of the analysis process are 1080p, 540p, 432p and 360p. Thus, the plurality of preset length video shots perform the down-sampling process by a down-sample scaler to obtain a plurality of low resolution video shots. The plurality of low resolution video shots are 720p, 540p, 432p and 360p. In other embodiments, the considered resolutions may have lower resolutions, such as 288p, 216p or 144p. The considered resolutions can be adjusted according to the required video quality.

Step A05: encoding the plurality of preset length video shots and the plurality of low resolution video shots with a preset fast encoding parameter and preset constant rate factors to obtain a plurality of encoded video shots. The all resolution video shots can be encoded by the open source encoders (x264, x265, libvpx, libaom, SVT-AV1 or VVenC). In the present embodiment, the M8 of the SVT-AV1 is choose as the preset fast encoding parameter. The constant rate factor (CRF) mode is used for all encoders. The selection of constant rate factor values is based on first selecting the AV1/VP9 constant rate factor values ranging from 23 to 63 and selecting equally spaced intermediate points to end up with the following set (23, 27, 31, 35, 39, 43, 47, 51, 55, 59, 63) of constant rate factor values.

Step A06: decoding the plurality of encoded video shots to obtain a plurality of decoded video shots. When the encoding process is done, the plurality of encoded video shots are decoded to obtain a plurality of decoded video shots.

Step A07: providing up-sampling process to the plurality of decoded video shots to obtain a plurality of analysis video shots. The plurality of decoded video shots perform the up-sampling process by an up-sample scaler to obtain a plurality of analysis video shots.

Step A08: calculating a quality index between the plurality of preset length video shots and the plurality of analysis video shots to obtain quality metrics. The quality index comprises peak signal to noise ratio (PSNR), structural similarity index measure (SSIM) or video multi-assessment method fusion (VMAF). The peak signal to noise ratio compares the difference in the pixel values between the plurality of preset length video shots and the plurality of analysis video shots, so as to calculate the peak signal to noise ratio. The structural similarity index measure measures image similarity from three aspects: brightness, contrast, and structure. The video multi-assessment method fusion predicts the subjective video quality based on a reference and a distorted video sequence.

Each of the plurality of preset length video shots and the plurality of analysis video shots may calculate the quality index. The quality index forming several points corresponding to the constant rate factor points. These points form the relation curves and the quality metrics 14 is the relation curves between the quality index and the bitrate corresponding to different resolutions.

Step A09: selecting convex hull points of the quality metrics. Since the quality metrics 14 are obtained, the convex hull points of each relation curve are selected as the operation points 15.

Step A10: calculating slopes between the convex hull points. The operation points 15 can be calculated to obtain the operation slopes 16 between the neighbor points.

Step A11: picking a plurality of operation points from the convex hull points with similar slopes to form a plurality of operation point series. Based on the above operation slopes 16, the similar slopes are picked up to form the plurality of operation point series 17.

Step A12: predicting a plurality of quantizer parameters of the plurality of operation point series. Based on the above operation point series 17, the relations of the video multi-assessment method fusion and the bitrate for the series are calculate. The predicted results of the series 18 may contain the plurality of quantizer parameters of the plurality of operation point series 17.

Step A13: picking the plurality of quantizer parameters and corresponding resolutions. The predicted results of the series 18 are picked up to determine the predicted quantizer parameters for the actual encoding process.

In stage 2, the convex hull encoding method includes the following steps (A14-A16):

Step A14: encoding the source video clip by the plurality of quantization parameters and the corresponding resolutions to obtain a compressed video. In this stage, the source video clip is encoded by the preset target quality, the predicted resolution and the predicted quantizer parameters to form the compressed video 19. The compressed video 19 is the encoding result of the source video clip. The compressed video 19 may be transmitted through the communication network with small data amount and can be decoded by the user device for performing the high quality video.

Step A15: decoding the compressed video. The convex hull encoding method may further conduct the comparison process. The compressed video 19 can be decoded and compared with the original source video clip or the other encoded video clip.

Step A16: calculating a BD-rate between the source video clip and the compressed video. The BD-rate between the source video clip and the compressed video 19 can be calculated to find the performance of the encoding process. In the present embodiment, the average BD-rate (PSNR, SSIM and VMAF) is 3.85%. In addition, the calculation speed is improved due to the calculation savings of the preset length video shots. The calculation cycles used in the present embodiment is only 24% of the conventional encoding process. The present disclosure may reduce a lot of computing resources without losing many BD-rate.

Figure 2:
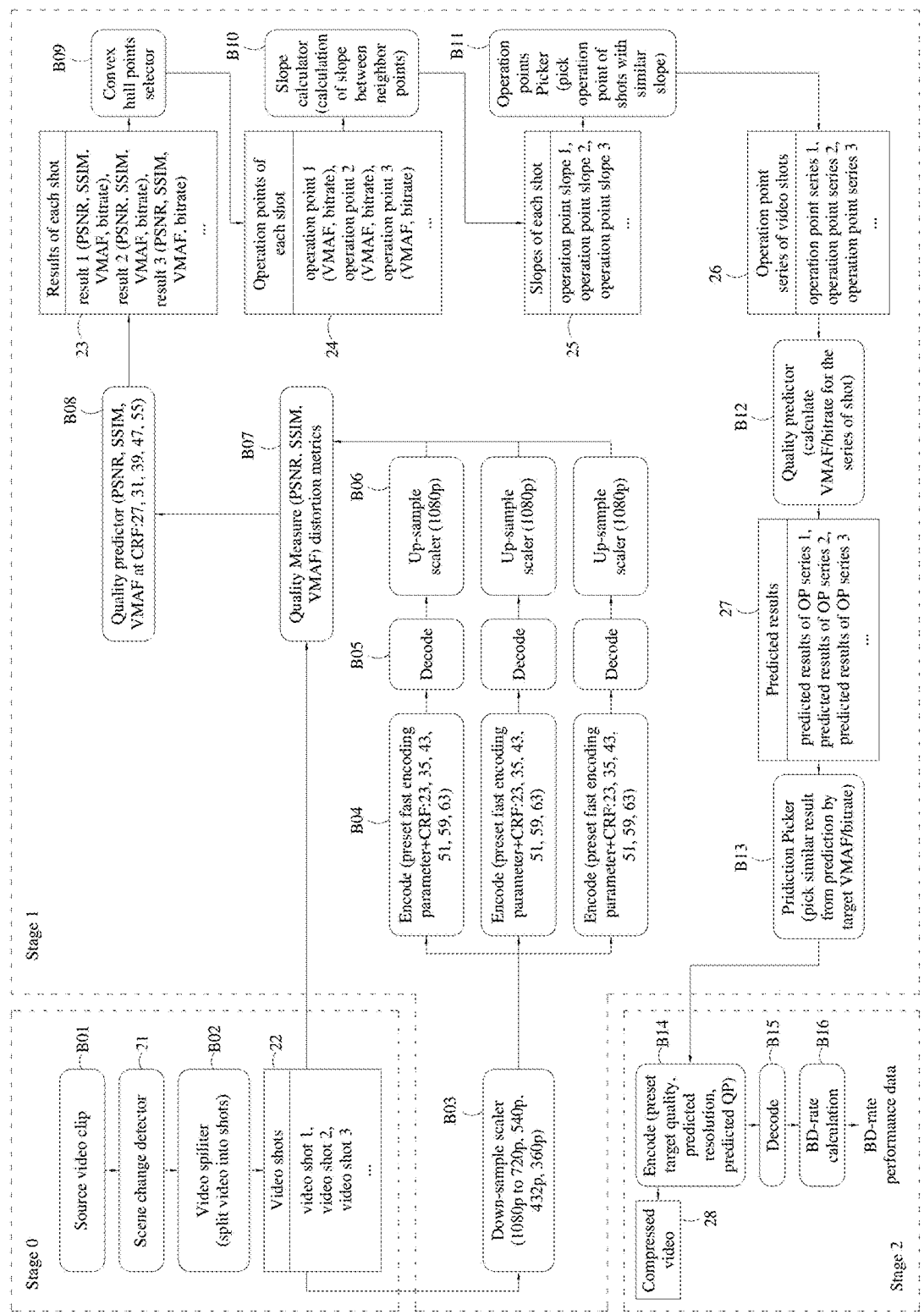
FIG. 2 is the process flow of the convex hull encoding method in accordance with the second embodiment of the present disclosure.

Please refer to FIG. 2, which is process flow of the convex hull encoding method in accordance with the second embodiment of the present disclosure. As shown in FIG. 2, the convex hull encoding method includes three stages. The first stage (stage 0) is the pre-processing process conducted to the source video. The second stage (stage 1) is the analysis process to the video shots. The third stage (stage 2) is the actual coding process to the source video.

In stage 0, the convex hull encoding method includes the following steps (B01-B02):

Step B01: providing a source video clip. The source video clip may be the video containing video on demand contents, such as movie, TV drama, music video. The video is broadcasted through the internet and the streaming application has grown significantly. Considering the large amount of data transferred through the communication network, the source video clip needs to be encoded and compressed for transmission and then decoded on the user side. The encoder performance can be evaluated by the BD-rate and the speed. The BD-rate is the difference in bitrate of video streams between two encoders when providing comparable image quality. Under a given image quality, the lower the bit rate, the better coding efficiency. A negative value of the BD-rate indicates that the test encoder is more efficient than the reference encoder. The speed is the computation periods or cycles used for the encoding process. The faster speed means that the encoder may have the lower computational complexity and loading.

Step B02: splitting the source video clip into a plurality of video shots by a video splitter, the plurality of video shots having a similar scene determined by a scene change detector. In the present disclosure, the source video clip is input to the scene change detector 21. The scene change detector 21 checking whether the scenes in the source video clip have changed. This change may be determined by the amount of change in pixels in each frame. Then the source video clip is splitting into a plurality of video shots 22 by a video splitter. The plurality of video shots 12 have the similar scene.

Different from the previous embodiment, the present embodiment does not slice the plurality of video shots 12 into preset length. The plurality of video shots 12 are directly used as the analysis data for the next stage.

In stage 1, the convex hull encoding method includes the following steps (B03-B12):

Step B03: providing down-sampling process to the plurality of video shots to obtain a plurality of low resolution video shots. In the present embodiment, the resolution of the source video clip is 1080p and the considered resolutions of the analysis process are 1080p, 540p, 432p and 360p. Thus, the plurality of video shots perform the down-sampling process by a down-sample scaler to obtain a plurality of low resolution video shots. The plurality of low resolution video shots are 720p, 540p, 432p and 360p. In other embodiments, the considered resolutions may have lower resolutions, such as 288p, 216p or 144p. The considered resolutions ca be adjusted according to the required video quality.

Step B04: encoding the plurality of video shots and the plurality of low resolution video shots with a preset fast encoding parameter and preset constant rate factor points to obtain a plurality of encoded video shots. The all resolution video shots can be encoded by the open source encoders (x264, x265, libvpx, libaom, SVT-AV1 or VVenC). In the present embodiment, the M8 of the SVT-AV1 is choose as the preset fast encoding parameter. The preset constant rate factor points may be the partial points among the constant rate factor values. The selection of constant rate factor values is based on first selecting the AV1/VP9 constant rate factor values ranging from 23 to 63 and selecting equally spaced intermediate points to end up with the following set (23, 27, 31, 35, 39, 43, 47, 51, 55, 59, 63) of constant rate factor values. All the video shots are then encoded by using libaom at the above mentioned 11 constant rate factor values, and x264 at a range of constant rate factor values from 14-51. The resulting average quality scores across all clips per constant rate factor value indicated that the AV1 constant rate factor values of 23 and 63 yield a quality level that matches approximately the one generated by constant rate factor 19 and 41 of x264 respectively. As a result, 11 constant rate factor points (19, 21, 23, 25, 27, 29, 31, 33, 35, 37, 41) were chosen for the x264, x265 and VVenC encoders. In the present embodiment, the preset constant rate factor points are 23, 35, 43, 51, 59 and 63 and other constant rate factor points 27, 31, 39, 47 and 55 can be obtained by the interpolation calculation between the two neighbor points.

Since the encoding process in the analysis process reduces the constant rate factor points, the computational loading of the encoding process in the analysis process can be significantly reduced.

Step B05: decoding the plurality of encoded video shots to obtain a plurality of decoded video shots. When the encoding process is done, the plurality of encoded video shots are decoded to obtain a plurality of decoded video shots.

Step B06: providing up-sampling process to the plurality of decoded video shots to obtain a plurality of analysis video shots. The plurality of decoded video shots perform the up-sampling process by an up-sample scaler to obtain a plurality of analysis video shots.

Step B07: calculating a quality index between the plurality of video shots and the plurality of analysis video shots to obtain partial quality metrics. The quality index comprises peak signal to noise ratio (PSNR), structural similarity index measure (SSIM) or video multi-assessment method fusion (VMAF). The peak signal to noise ratio compares the difference in the pixel values between the plurality of preset length video shots and the plurality of analysis video shots, so as to calculate the peak signal to noise ratio. The structural similarity index measure measures image similarity from three aspects: brightness, contrast, and structure. The video multi-assessment method fusion predicts the subjective video quality based on a reference and a distorted video sequence.

Each of the plurality of video shots and the plurality of analysis video shots may calculate the quality index. The quality index forming several points corresponding to the constant rate factor points. These points form the relation curves and the quality metrics is the relation curves between the quality index and the bitrate corresponding to different resolutions. However, the results of the present encoding process did not calculate all the constant rate factors. Therefore, the quality metrics are partial. The entire relation curves need to be completed by the following step.

Step B08: calculating the partial quality metrics to obtain quality metrics by using interpolation to the preset constant rate factor points. The constant rate factor points 27, 31, 39, 47 and 55 can be obtained by the interpolation calculation between the two neighbor points, so as to obtain the quality metrics 23.

Step B09: selecting convex hull points of the quality metrics. Since the quality metrics 23 are obtained, the convex hull points of each relation curve are selected as the operation points 24.

Step B10: calculating slopes between the convex hull points. The operation points 24 can be calculated to obtain the operation slopes 25 between the neighbor points.

Step B11: picking a plurality of operation points from the convex hull points with similar slopes to form a plurality of operation point series. Based on the above operation slopes 25, the similar slopes are picked up to form the plurality of operation point series 26.

Step B12: predicting a plurality of quantizer parameters of the plurality of operation point series. Based on the above operation point series 26, the relations of the video multi-assessment method fusion and the bitrate for the series are calculate. The predicted results of the series 27 may contain the plurality of quantizer parameters of the plurality of operation point series 26.

Step B13: picking the plurality of quantizer parameters and corresponding resolutions. The predicted results of the series 27 are picked up to determine the predicted quantizer parameters for the actual encoding process.

In stage 2, the convex hull encoding method includes the following steps (B14-B16):

Step B14: encoding the source video clip by the plurality of quantization parameters and corresponding resolutions to obtain a compressed video. In this stage, the source video clip is encoded by the preset target quality, the predicted resolution and the predicted quantizer parameters to form the compressed video 28. The compressed video 28 is the encoding result of the source video clip. The compressed video 28 may be transmitted through the communication network with small data amount and can be decoded by the user device for performing the high quality video.

Step B15: decoding the compressed video. The convex hull encoding method may further conduct the comparison process. The compressed video 28 can be decoded and compared with the original source video clip or the other encoded video clip.

Step B16: calculating a BD-rate between the source video clip and the compressed video. The BD-rate between the source video clip and the compressed video 28 can be calculated to find the performance of the encoding process. In the present embodiment, the average BD-rate (PSNR, SSIM and VMAF) is 0.34%. The BD-rate lost is very small. The calculation speed is also improved due to the calculation savings of the preset quantization parameters. The calculation cycles used in the present embodiment is 64% of the conventional encoding process.

Figure 3:
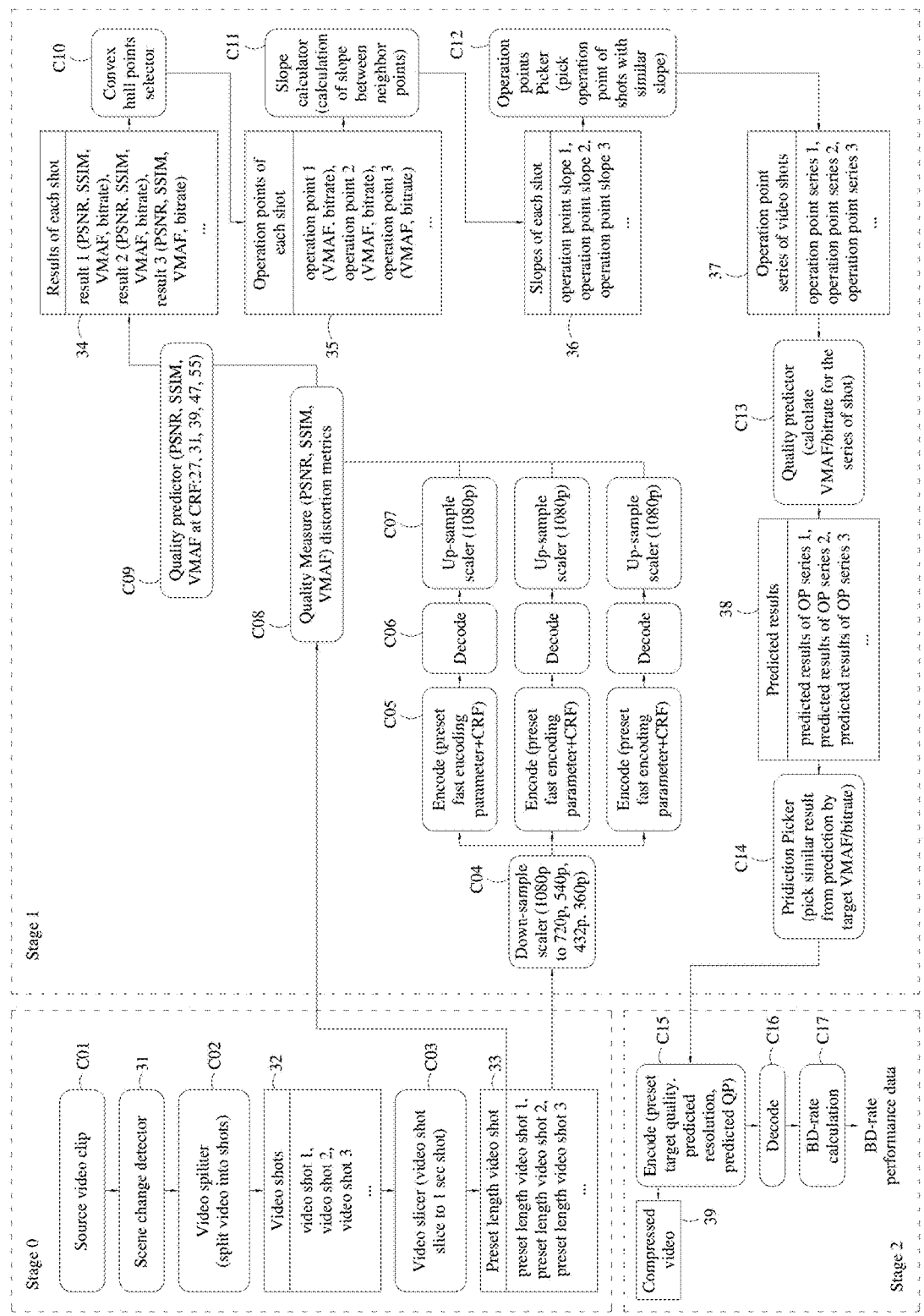
FIG. 3 is the process flow of the convex hull encoding method in accordance with the third embodiment of the present disclosure.

Please refer to FIG. 3, which is the process flow of the convex hull encoding method in accordance with the third embodiment of the present disclosure. As shown in FIG. 3, the convex hull encoding method includes three stages. The first stage (stage 0) is the pre-processing process conducted to the source video. The second stage (stage 1) is the analysis process to the video shots. The third stage (stage 2) is the actual coding process to the source video.

In stage 0, the convex hull encoding method includes the following steps (C01-C03):

Step C01: providing a source video clip. The source video clip may be the video containing video on demand contents, such as movie, TV drama, music video. The video is broadcasted through the internet and the streaming application has grown significantly. Considering the large amount of data transferred through the communication network, the source video clip needs to be encoded and compressed for transmission and then decoded on the user side. The encoder performance can be evaluated by the BD-rate and the speed. The BD-rate is the difference in bitrate of video streams between two encoders when providing comparable image quality. Under a given image quality, the lower the bit rate, the better coding efficiency. A negative value of the BD-rate indicates that the test encoder is more efficient than the reference encoder. The speed is the computation periods or cycles used for the encoding process. The faster speed means that the encoder may have the lower computational complexity and loading.

Step C02: splitting the source video clip into a plurality of video shots by a video splitter, the plurality of video shots having a similar scene determined by a scene change detector. In the present disclosure, the source video clip is input to the scene change detector 31. The scene change detector 31 checking whether the scenes in the source video clip have changed. This change may be determined by the amount of change in pixels in each frame. Then the source video clip is splitting into a plurality of video shots 32 by a video splitter. The plurality of video shots 32 have the similar scene.

Step C03: slicing each of the plurality of video shots to obtain a plurality of preset length video shots. In the previous step, the source video clip is splitting into a plurality of video shots 32 and each of the plurality of video shots 32 may have a different length. The similar scenes can be encoded with similar parameters, the present step slices each of the plurality of video shots into the plurality of preset length video shots by the video slicer. The plurality of preset length video shots have the same preset video length, for example, a one-second video. The plurality of preset length video shots are used to be the analysis data for the next stage. Since the analysis data has been reduced to the preset length video, the computational complexity of the following analysis steps can be significantly reduced.

In stage 1, the convex hull encoding method includes the following steps (C04-C14):

Step C04: providing down-sampling process to the plurality of preset length video shots to obtain a plurality of low resolution video shots. In the present embodiment, the resolution of the source video clip is 1080p and the considered resolutions of the analysis process are 1080p, 540p, 432p and 360p. Thus, the plurality of preset length video shots perform the down-sampling process by a down-sample scaler to obtain a plurality of low resolution video shots. The plurality of low resolution video shots are 720p, 540p, 432p and 360p. In other embodiments, the considered resolutions may have lower resolutions, such as 288p, 216p or 144p. The considered resolutions ca be adjusted according to the required video quality.

Step C05: encoding the plurality of preset length video shots and the plurality of low resolution video shots with a preset fast encoding parameter and preset constant rate factor points to obtain a plurality of encoded video shots. The all resolution video shots can be encoded by the open source encoders (x264, x265, libvpx, libaom, SVT-AV1 or VVenC). In the present embodiment, the M8 of the SVT-AV1 is choose as the preset fast encoding parameter. The preset constant rate factor points may be the partial points among the constant rate factor values. The selection of constant rate factor values is based on first selecting the AV1/VP9 constant rate factor values ranging from 23 to 63 and selecting equally spaced intermediate points to end up with the following set (23, 27, 31, 35, 39, 43, 47, 51, 55, 59, 63) of constant rate factor values. All the video shots are then encoded by using libaom at the above mentioned 11 constant rate factor values, and x264 at a range of constant rate factor values from 14-51. The resulting average quality scores across all clips per constant rate factor value indicated that the AV1 constant rate factor values of 23 and 63 yield a quality level that matches approximately the one generated by constant rate factor 19 and 41 of x264 respectively. As a result, 11 constant rate factor points (19, 21, 23, 25, 27, 29, 31, 33, 35, 37, 41) were chosen for the x264, x265 and VVenC encoders.

In the present embodiment, the preset constant rate factor points are 23, 35, 43, 51, 59 and 63 and other constant rate factor points 27, 31, 39, 47 and 55 can be obtained by the interpolation calculation between the two neighbor points. Since the encoding process in the analysis process reduces the constant rate factor points, the computational loading of the encoding process in the analysis process can be significantly reduced.

Step C06: decoding the plurality of encoded video shots to obtain a plurality of decoded video shots. When the encoding process is done, the plurality of encoded video shots are decoded to obtain a plurality of decoded video shots.

Step C07: providing up-sampling process to the plurality of decoded video shots to obtain a plurality of analysis video shots. The plurality of decoded video shots perform the up-sampling process by an up-sample scaler to obtain a plurality of analysis video shots.

Step C08: calculating a quality index between the plurality of preset length video shots and the plurality of analysis video shots to obtain quality metrics. The quality index comprises peak signal to noise ratio (PSNR), structural similarity index measure (SSIM) or video multi-assessment method fusion (VMAF). The peak signal to noise ratio compares the difference in the pixel values between the plurality of preset length video shots and the plurality of analysis video shots, so as to calculate the peak signal to noise ratio. The structural similarity index measure measures image similarity from three aspects: brightness, contrast, and structure. The video multi-assessment method fusion predicts the subjective video quality based on a reference and a distorted video sequence.

Each of the plurality of preset length video shots and the plurality of analysis video shots may calculate the quality index. The quality index forming several points corresponding to the constant rate factor points. These points form the relation curves and the quality metrics is the relation curves between the quality index and the bitrate corresponding to different resolutions. However, the results of the present encoding process did not calculate all the constant rate factors. Therefore, the quality metrics are partial. The entire relation curves need to be completed by the following step.

Step C09: calculating the partial quality metrics to obtain quality metrics by using interpolation to the preset constant rate factor points. The constant rate factor points 27, 31, 39, 47 and 55 can be obtained by the interpolation calculation between the two neighbor points, so as to obtain the quality metrics 34

Step C10: selecting convex hull points of the quality metrics. Since the quality metrics 34 are obtained, the convex hull points of each relation curve are selected as the operation points 35.

Step C11: calculating slopes between the convex hull points. The operation points 35 can be calculated to obtain the operation slopes 36 between the neighbor points.

Step C12: picking a plurality of operation points from the convex hull points with similar slopes to form a plurality of operation point series. Based on the above operation slopes 36, the similar slopes are picked up to form the plurality of operation point series 37.

Step C13: predicting a plurality of quantizer parameters of the plurality of operation point series. Based on the above operation point series 37, the relations of the video multi-assessment method fusion and the bitrate for the series are calculate. The predicted results of the series 38 may contain the plurality of quantizer parameters of the plurality of operation point series 37.

Step C14: picking the plurality of quantizer parameters and corresponding resolutions. The predicted results of the series 38 are picked up to determine the predicted quantizer parameters for the actual encoding process.

In stage 2, the convex hull encoding method includes the following steps (C15-C17):

Step C15: encoding the source video clip by the plurality of quantization parameters and corresponding resolutions to obtain a compressed video. In this stage, the source video clip is encoded by the preset target quality, the predicted resolution and the predicted quantizer parameters to form the compressed video 39. The compressed video 39 is the encoding result of the source video clip. The compressed video 39 may be transmitted through the communication network with small data amount and can be decoded by the user device for performing the high quality video.

Step C16: decoding the compressed video. The convex hull encoding method may further conduct the comparison process. The compressed video 39 can be decoded and compared with the original source video clip or the other encoded video clip.

Step C17: calculating a BD-rate between the source video clip and the compressed video. The BD-rate between the source video clip and the compressed video 39 can be calculated to find the performance of the encoding process. In the present embodiment, the average BD-rate (PSNR, SSIM and VMAF) is 4.06%. In addition, the calculation speed is improved due to the calculation savings of the preset length video shots. The calculation cycles used in the present embodiment is only 15% of the conventional encoding process. The present disclosure may reduce a lot of computing resources without losing many BD-rate.

Figure 4A:
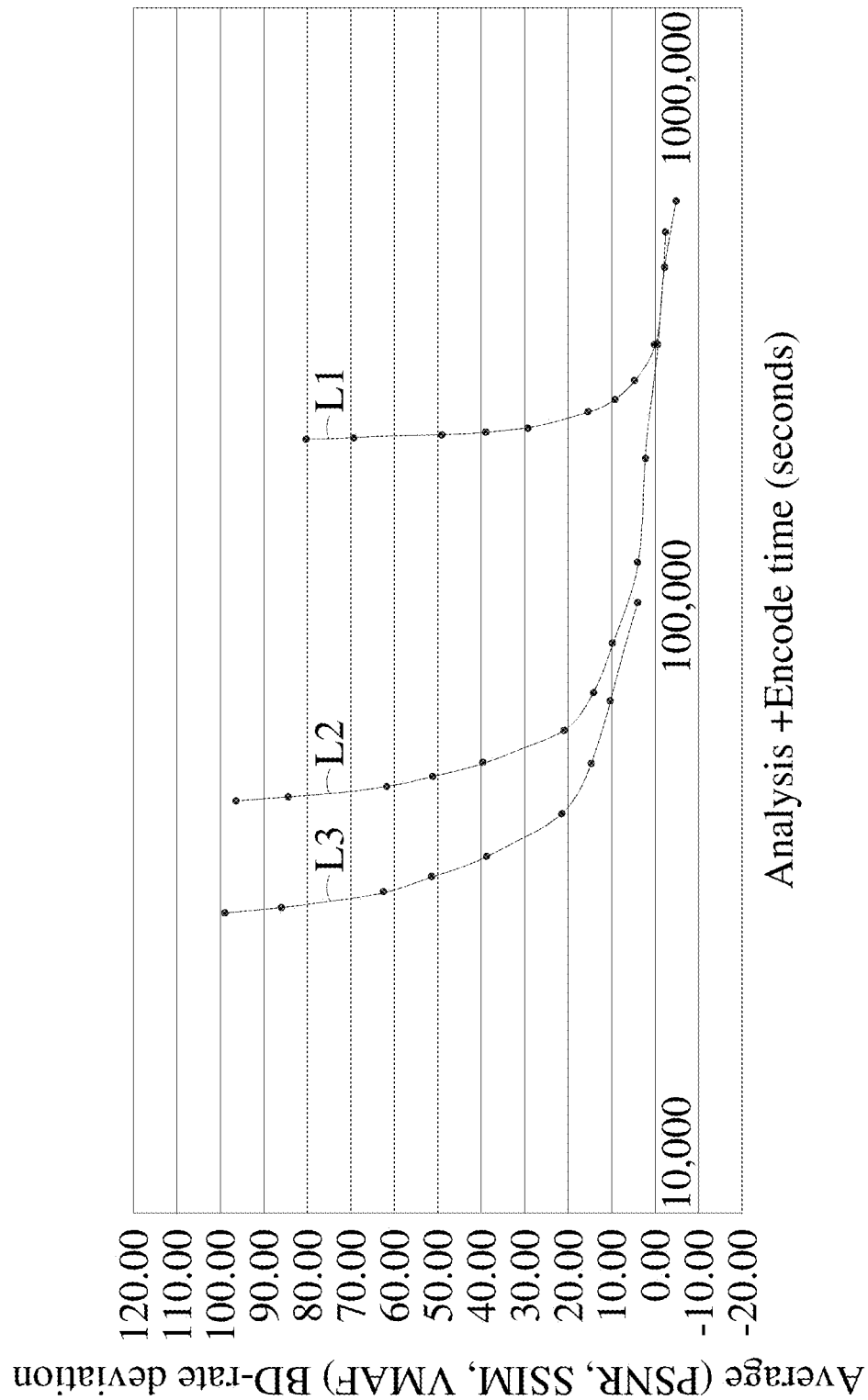
FIG. 4A to FIG. 4C are the schematic diagrams of the test results of the convex hull encoding method in accordance with the embodiment of the present disclosure.
Figure 4B:
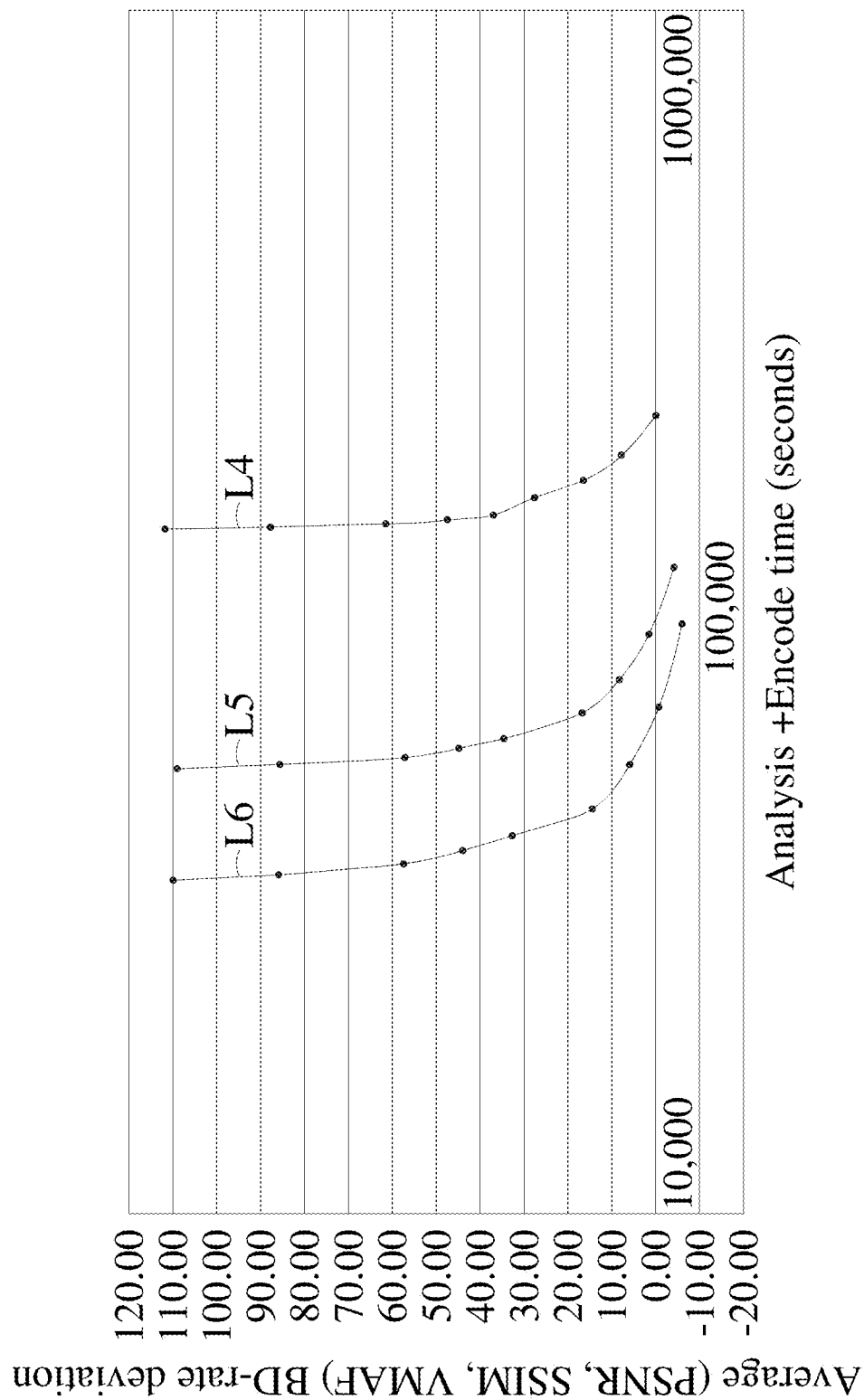
Figure 4C:
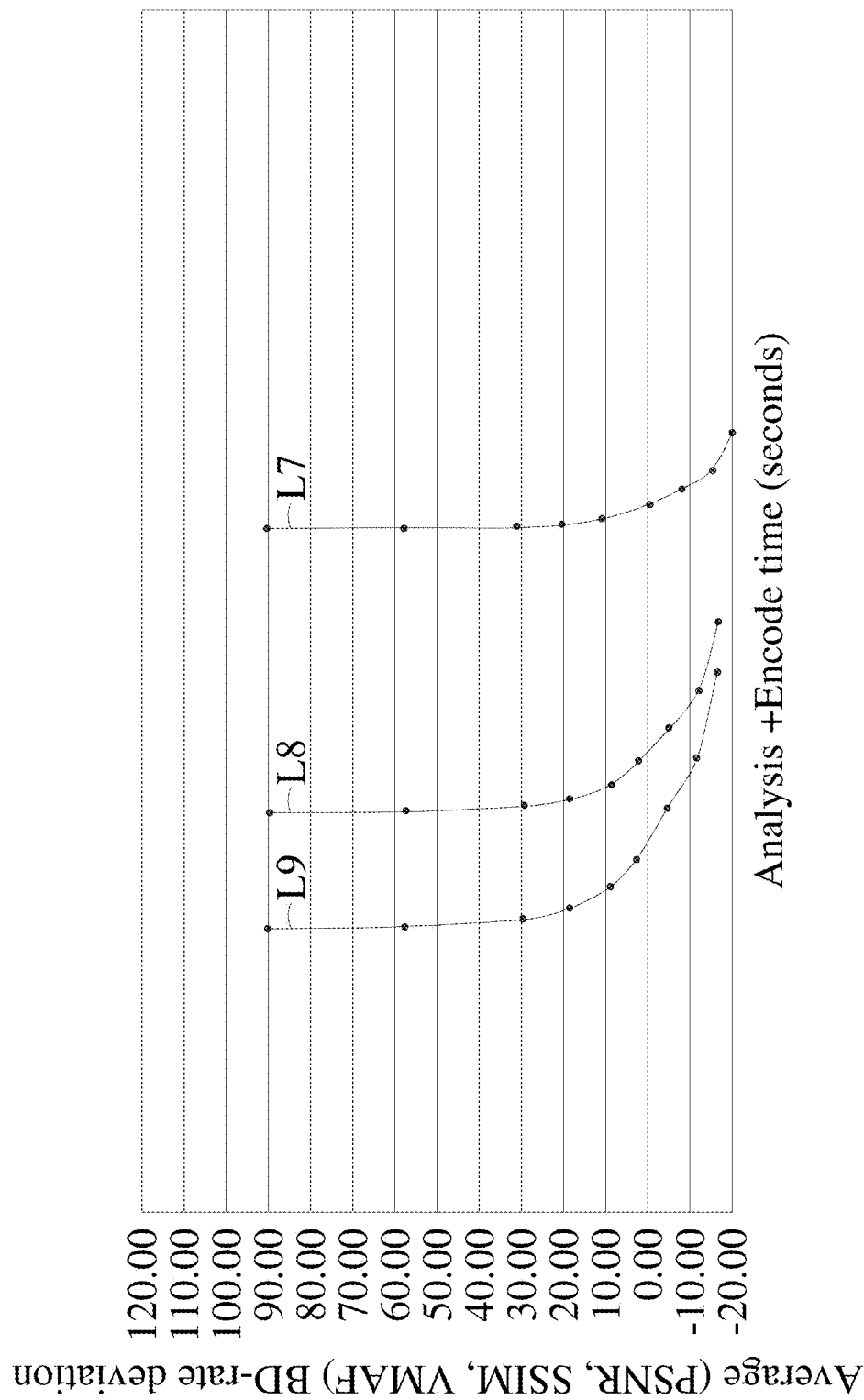

Please refer to FIG. 4A to FIG. 4C, which are the schematic diagrams of the test results of the convex hull encoding method in accordance with the embodiment of the present disclosure. The test result is the relationship between the average BD-rate deviation and the analysis and encode time. The source video clip tested in FIG. 4A is 1920×1080, 29.97 fps and 14296 frames. The source video clip tested in FIG. 4B is 1920×800, 24 fps and 17620 frames. The source video clip tested in FIG. 4C is 1920×1080, 60 fps and 10806 frames.

In FIGS. 4A to 4C, lines L1, L4 and L7 are the results of the encoding method using the fast encoding parameter selection. Lines L2, L5 and L8 are the results of the convex hull encoding method using the process indicated in the first embodiment. Lines L3, L6 and L9 are the result of the convex hull encoding method using the process indicated in the third embodiment. As shown in the figures, based on the same BD-rate level, the present disclosure reduces the analysis and encode time. The calculation cycle is reduced to minimize the computational demand. Thus, the convex hull encoding method recited in the present application may perform excellent coding performance.

The present disclosure disclosed herein has been described by means of specific embodiments. However, numerous modifications, variations and enhancements can be made thereto without departing from the spirit and scope of the disclosure set forth in the claims.

What is claimed is:

1. A convex hull encoding method, comprising following steps of:
   providing a source video clip;
   splitting the source video clip into a plurality of video shots by a video splitter, the plurality of video shots having a similar scene determined by a scene change detector;
   slicing each of the plurality of video shots to obtain a plurality of preset length video shots;
   providing down-sampling process to the plurality of preset length video shots to obtain a plurality of low resolution video shots;
   encoding the plurality of preset length video shots and the plurality of low resolution video shots with a preset fast encoding parameter and preset constant rate factors to obtain a plurality of encoded video shots and decoding the plurality of encoded video shots to obtain a plurality of decoded video shots;
   providing up-sampling process to the plurality of decoded video shots to obtain a plurality of analysis video shots;
   calculating a quality index between the plurality of preset length video shots and the plurality of analysis video shots to obtain quality metrics;
   selecting convex hull points of the quality metrics and calculating slopes between the convex hull points;
   picking a plurality of operation points from the convex hull points with similar slopes to form a plurality of operation point series and predicting a plurality of quantizer parameters of the plurality of operation point series and corresponding resolutions;
   encoding the source video clip by the plurality of quantization parameters and the corresponding resolutions to obtain a compressed video.

2. The convex hull encoding method of claim 1, wherein the quality index comprises peak signal to noise ratio, structural similarity index measure or video multi-assessment method fusion.

3. The convex hull encoding method of claim 1, wherein the preset fast encoding parameter is M8 of the SVT-AV1, values of the preset constant rate factors are 23, 27, 31, 35, 39, 43, 47, 51, 55, 59 and 63.

4. The convex hull encoding method of claim 1, further comprising:
   decoding the compressed video and calculating a BD-rate between the source video clip and the compressed video.

5. The convex hull encoding method of claim 1, wherein the source video clip is 1080p and the plurality of low resolution video shots are 720p, 540p, 432p and 360p.

* * * * *